United States Patent
Iijima et al.

[11] Patent Number: 5,685,564
[45] Date of Patent: Nov. 11, 1997

[54] STEERING COLUMN SUPPORT STRUCTURE OF A VEHICLE

[75] Inventors: Toshio Iijima; Hideaki Takaishi; Katsuaki Sasaki; Shinji Kumagai, all of Saitama, Japan

[73] Assignee: Honda Giken Kogyo Kabushiki Kaisha, Tokyo, Japan

[21] Appl. No.: 543,026

[22] Filed: Oct. 13, 1995

[30] Foreign Application Priority Data

Oct. 19, 1994 [JP] Japan ................. 6-253160

[51] Int. Cl.⁶ .................................................. B62D 1/18
[52] U.S. Cl. .......................... 280/777; 280/780; 74/492
[58] Field of Search ............................... 280/777, 780, 280/779; 74/492, 493

[56] References Cited

U.S. PATENT DOCUMENTS

| | | | |
|---|---|---|---|
| 4,228,695 | 10/1980 | Trevisson et al. | 74/492 |
| 4,655,475 | 4/1987 | Van Gelderen | 280/777 |
| 4,738,469 | 4/1988 | Ushijima et al. | 280/777 |
| 4,946,195 | 8/1990 | Ioka et al. | 280/777 |

FOREIGN PATENT DOCUMENTS

| | | | |
|---|---|---|---|
| 0581432 | 2/1994 | European Pat. Off. | 280/777 |
| 1254470 | 10/1989 | Japan . | |

*Primary Examiner*—Christopher P. Ellis
*Attorney, Agent, or Firm*—Weiner, Carrier, Burt & Esser, P.C.; Joseph P. Carrier; Irving M. Weiner

[57] ABSTRACT

A steering column is supported on a rear support portion provided on a steering hanger and on a front support portion provided on a steering pivot connected to the steering hanger, and a steering shaft provided at its rear end with a steering wheel is rotatably supported by the steering column. Opposite ends of a connection member are pivotally supported at a dashboard lower member and the steering pivot by pins. If the dashboard lower member is retreated by a frontal collision of a vehicle, the steering pivot and the front support portion are raised upward by a load transmitted through the connection member, and the upper end of the steering column is turned in a rearward and downward direction about the rear support portion. With this arrangement, it is possible to prevent the steering wheel from being turned in an upward and forward direction, and an air bag can reliably be operated to protect the vehicle driver during the collision.

14 Claims, 2 Drawing Sheets

STEERING COLUMN SUPPORT STRUCTURE OF A VEHICLE

BACKGROUND OF THE INVENTION

1. Field of the Invention

The present invention relates to a steering column support structure of a vehicle, comprising a steering column for rotatably supporting a steering shaft provided at a rear end thereof with a steering wheel, and a front and a rear support means for supporting the steering column on a vehicle body.

2. Description of the Relevant Art

There is a known steering column support structure of a vehicle in which an upper end of a steering column is positively turned in a forward and upward direction of a vehicle body by utilizing the fact that a dashboard which is pushed by a retreating engine at the time of frontal collision of a vehicle is rearwardly deformed, so as to prevent a situation that a driver of the vehicle secondarily hits his or her head against a steering wheel provided at an upper end of the steering column (see Japanese Patent Application Laid-open No. 254470/89).

However, in a vehicle in which an air bag is mounted in the steering wheel, if an upper end of a steering column is turned in a forward and upward direction as in the above-described known structure, the air bag is inflated upwardly along a front windshield, which makes it difficult to reliably hold and protect the driver's head. In general, at the time of a frontal collision of a vehicle in which a steering column is inclined rearwardly at a small angle as in a so-called "one-box car", the upper end of the steering column tends to mm in a forward and upward direction. However, it is desirable to suppress or minimize such tendency to the utmost so as to cause the air bag to effectively function.

SUMMARY OF THE INVENTION

The present invention has been accomplished in view of the above circumstances, and it is an object of the invention to suppress or minimize a tendency that an upper end of a steering column is turned in a forward and upward direction at the time of a frontal collision of a vehicle.

To achieve the above object, according to a first feature of the present invention, there is provided a steering column support structure of a vehicle, comprising a steering column for rotatably supporting a steering shaft provided at a rear end thereof with a steering wheel, and a front support means and a rear support means for supporting the steering column on a vehicle body, wherein a first connection point provided at a dashboard and a second connection point provided in the vicinity of the front support means are connected by a connection member, and a straight line extending from the first connection point through the second connection point passes above the rear support means.

With this arrangement, if the dashboard is retreated by the frontal collision of the vehicle, the connection member pushes the front support means rearward. At that time, a direction of a load which is transmitted from the first connection point to the second connection point passes above the rear support means. Therefore, the load acts such a to push the front support means upward to turn the upper end of the steering column in a rearward and downward direction about the rear support means.

Further, according to a second feature of the invention, in addition to the first feature, the dashboard and the connection member are turnably connected at the first connection point, and a portion of the vehicle body in the vicinity of the front support means and the connection member are turnably connected at the second connection point.

With this arrangement, only a compression load is applied to the connection member, and it is possible to properly guide, from the first connection point to the second connection point, the load which is transmitted from the dashboard through the connection member to the vicinity of the front support means.

The above and other objects, features and advantages of the invention will become apparent from the following description of a preferred embodiment taken in conjunction with the accompanying drawings.

BRIEF DESCRIPTION OF THE DRAWINGS

FIGS. 1 and 2 show one embodiment of the present invention, wherein

FIG. 1 is a vertical sectional view of a front portion of a vehicle body; and

FIG. 2 is a view for explaining the operation at the time of frontal collision.

DESCRIPTION OF THE PREFERRED EMBODIMENT

Figure 1:
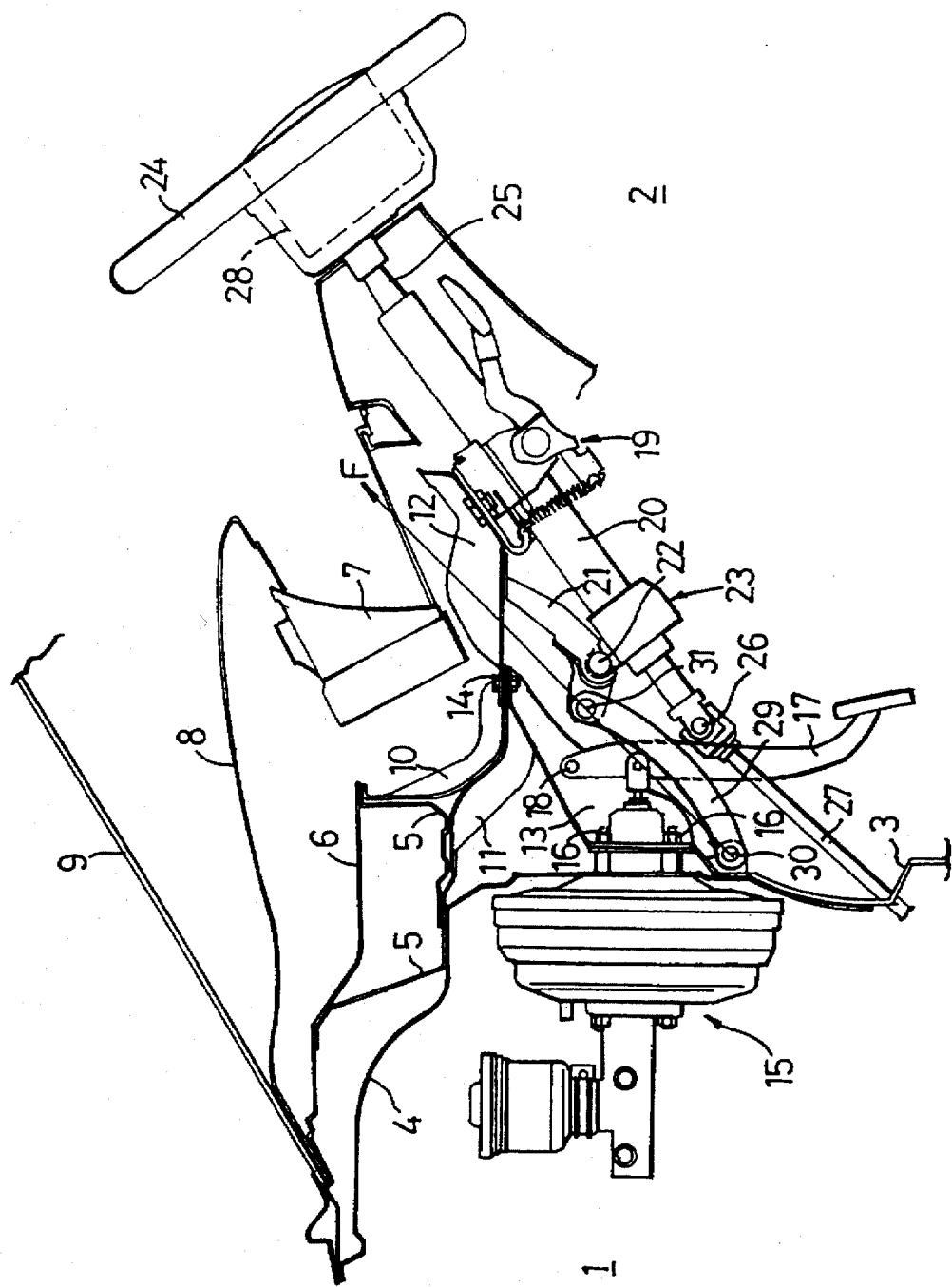

As shown in FIG. 1 an engine compartment 1 and a passenger compartment 2 of a vehicle are defined forth and back, respectively, by a dashboard lower member 3 and a dashboard upper member 4 which are joined with each other. Cowl top inner members 5 and 5 which are joined on an upper surface of the dashboard upper member 4, as well as a cowl top outer member 6 are covered with an instrument panel 8 having a combination meter 7. A front windshield 9 is disposed above the instrument panel 8.

A pedal bracket upper member 10 and a pedal bracket lower member 11 are connected to the cowl top inner members 5 and 5 such as to extend in a rearward and downward direction. A front end of a steering hanger 12 and a rear end of a pedal bracket 13 are fastened together to rear ends of the pedal bracket upper member 10 and the pedal bracket lower member 11 by means of a bolt 14. A brake system 15 including a master cylinder, a vacuum booster and the like, and a front end of the pedal bracket 13 are fastened together to the dashboard lower member 3 and the dashboard upper member 4 by means of bolts 16. A brake pedal 17 is pivotally supported on the pedal bracket 13 by a pin 18.

An intermediate portion of a steering column 20 is supported on a lower surface of the steering hanger 12 through a rear support means 19. A front support means 23 is supported, by a pin 22, on a steering pivot 21 which is connected to a lower surface of the steering hanger 12. A front portion of the steering column 20 is supported by the front support means 23. A steering shaft 25 is provided at its rear end with a steering wheel 24 and is rotatably supported within the steering column 20. A front end of the steering shaft 25 is connected to an intermediate shaft 27 through a universal joint 26, and a front end of the intermediate shaft 27 is connected to a steering gear box which is not shown.

Each of the pedal bracket upper member 10, the pedal bracket lower member 11 and the steering hanger 12 has a relatively high rigidity and is hardly deformed by a usual frontal collision of a vehicle. On the other hand, each of the pedal bracket 13 and the steering pivot 21 has a relatively low rigidity, and is deformed at the time of a frontal collision of a vehicle as described hereinafter.

The steering column 20 is slidably supported by the rear support means 19 and the front support means 23. Therefore, when the steering column 20 secondarily strokes forwardly at the time of a frontal collision of a vehicle, a predetermined slide resistance is applied between the steering column 20 and the rear support means 19 so as to absorb a shock. Accommodated in the steering wheel is an air bag 28 which inflates for holding and protecting a driver's head at the time of a collision of a vehicle.

The dashboard lower member 3 and the steering pivot 21 are connected with each other by a rod-like connection member 29. A front end of the connection member 29 is pivotally supported by a rear surface of the dashboard lower member 3 through a pin 30 as a first connection point. A rear end of the connection member 29 is pivotally supported on a front end of the steering pivot 21 through a pin 31 as a second connection point. With this arrangement, only a compression load is applied to the connection member 29 in the event of a frontal collision. A straight line connecting the pin 30 (the first connection point) and the pin 31 (the second connection point), i.e., a line of action of the load F which is transmitted from the dashboard lower member 3 to the steering pivot 21 is set so as to pass above the rear support means 19.

Next, the operation of this preferred embodiment of the present invention having the above-described arrangement will be described below.

Figure 2:
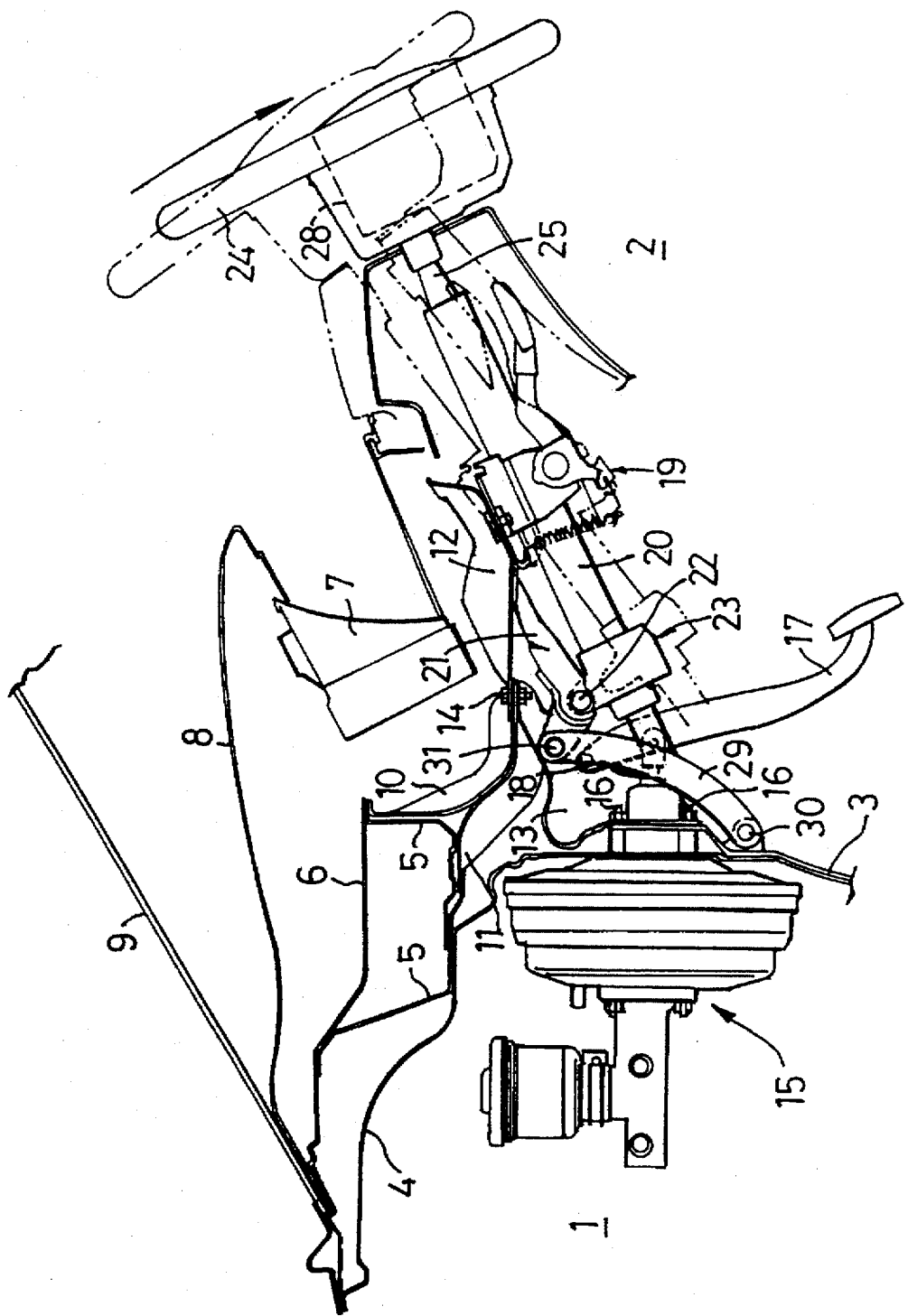

If the engine (not shown) is retreated by a frontal collision of a vehicle, the dashboard lower member 3 which is pushed by the engine moves rearward while deforming the pedal bracket 13 as shown in FIG. 2. As a result, the connection member 29 whose front end is pivotally supported on a back surface of the dashboard lower member 3 through the pin 30 moves rearward, and the steering pivot 21 which is pivotally supported on the rear end of the connection member 29 through the pin 31 is pushed rearward.

The rear support means 19 for supporting the intermediate portion of the steering column 20 is fixed to the steering hanger 12 having a high rigidity. Therefore, at the time of a collision, a position of the rear support means 19 is not moved almost at all, but the steering pivot 21 having a relatively low rigidity is buckled by a pressing force of the connection member 29. Therefore, a position of the front support means 23 is moved.

At that time, a direction of the load F transmitted from the dashboard lower member 3 through the connection member 29 to the steering pivot 21 matches a direction connecting both the pins 30 and 31, because opposite ends of the connection member 29 are pivotally supported through both the pins 30 and 31. Because the load F passes above the rear support means 19, the front support means 23 is pushed upward by the load F, and the steering column 20 is turned about the rear support means 19 such that a rear end of the steering column 20 having the steering wheel 24 thereon is lowered. As a result, the steering wheel 24 is turned down from a position shown by chain lines to a position shown by solid lines in FIG. 2.

Therefore, at the time of a frontal collision of a vehicle, the rear end of the steering column 20 is prevented from turning in a forward and upward direction. When the air bag system 28 mounted in the steering wheel 24 is operated, it is possible to reliably inflate the air bag toward the driver of the vehicle, and to secondarily stroke the steering column 20 reliably so as to absorb a shock caused by the rear support means 19.

Although the preferred embodiment of the present invention has been described in detail, it will be understood that the present invention is not limited to the above-described embodiment, and various modifications may be made without departing from the spirit and scope of the invention defined in claims.

For example, although the rear end of the connection member 29 is connected to the steering pivot 21, the rear end may directly be connected to the front support means 23. In short, what is necessary is that the rear end of the connection member 29 should be connected in the vicinity of the front support means 23.

What is claimed is:

1. A steering column support structure of a vehicle having a steering column for rotatably supporting a steering shaft provided at a rear end thereof with a steering wheel, comprising:

a front support means and a rear support means for supporting said steering column on a vehicle body;

a first connection point provided at a dashboard and a second connection point provided in a vicinity of the front support means;

a connection member connecting said first and second connection points; and a straight line extending from said first connection point through said second connection point passes above the rear support means.

2. A steering column support structure according to claim 1, wherein said dashboard and said connection member are turnably connected at said first connection point, and a portion of the vehicle in the vicinity of said front support means and said connection member are turnably connected at said second connection point.

3. A steering column support structure according to claim 2, wherein said portion of the vehicle comprises a steering pivot connected to said front support means.

4. A steering column support structure according to claim 2, wherein said portion of the vehicle comprises said front support means.

5. A steering column support structure for a vehicle having a steering column supporting a steering shaft with a steering wheel at a rear end thereof, comprising:

a front support means and a rear support means for supporting the steering column on a vehicle body; and means, operatively connecting a dashboard of the vehicle body and a front portion of said steering column, for moving a rear portion of said steering column in a rearward and downward direction when a frontal collision of the vehicle deforms the dashboard rearwardly.

6. A steering column support structure according to claim 5, wherein said moving means includes a first connection point provided at the dashboard, a second connection point provided in a vicinity of the front support means such that a straight line extending from said first connection point through said second connection point passes above the rear support means, and a connection member connecting said first and second connection points.

7. A steering column support structure according to claim 6, wherein said dashboard and said connection member are pivotally connected at said first connection point, and a portion of the vehicle in a vicinity of the front support means and said connection member are turnably connected at said second connection point.

8. A steering column support structure according to claim 7, wherein said portion of the vehicle comprises a steering pivot connected to said front support means.

9. A steering column support structure according to claim 7, wherein said portion of the vehicle comprises said front support means.

10. A steering column support structure according to claim 5, wherein said moving means transmits a load imposed on the dashboard during the frontal collision in a direction passing above said rear support means.

11. A steering column support structure according to claim 5, wherein said moving means pushes said front support means upwardly such that the steering column is turned about said rear support means when said dashboard is deformed rearwardly.

12. A steering column support structure according to claim 5, wherein said front and rear support means slidably support said steering column such that a slide resistance thereof absorbs a shock applied to the steering column when the column is secondarily stroked.

13. A steering column support structure according to claim 5, wherein said vehicle further includes an air bag provided in said steering wheel.

14. A steering column support structure for a vehicle having a steering column supporting a steering shaft with a steering wheel at a rear end thereof, comprising:

a front support means and a rear support means for supporting the steering column on a vehicle body; and means, operatively connecting a dashboard of the vehicle body and a front portion of the steering column, for guiding a load transmitted from the dashboard through the connection member to a vicinity of the front support means when the dashboard is deformed rearwardly in a frontal collision of the vehicle such that a rear portion of the steering column is prevented from moving upwardly and forwardly.

* * * * *

UNITED STATES PATENT AND TRADEMARK OFFICE
CERTIFICATE OF CORRECTION

PATENT NO. : 5,685,564
DATED : 11 November 1997
INVENTOR(S) : Toshio Iijima, Hideaki Takaishi, Katsuaki Sasaki, Shinji Kumagai It is certified that error appears in the above-indentified patent and that said Letters Patent is hereby corrected as shown below:

Column 1, line numbered approximately 32, change "mm" to --turn--;
line numbered approximately 61, change "a to" to --as to--.

Signed and Sealed this

Third Day of February, 1998

BRUCE LEHMAN

Attest:

Attesting Officer

Commissioner of Patents and Trademarks